(12) United States Patent
Baskaran et al.

(10) Patent No.: US 11,200,035 B1
(45) Date of Patent: Dec. 14, 2021

(54) METHODS AND APPARATUS FOR AUTOMATIC COMMUNICATION OPTIMIZATIONS IN A COMPILER BASED ON A POLYHEDRAL REPRESENTATION

(71) Applicant: Reservoir Labs, Inc., New York, NY (US)

(72) Inventors: Muthu M. Baskaran, Old Tappan, NJ (US); Richard A. Lethin, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 15/822,996

(22) Filed: Nov. 27, 2017

Related U.S. Application Data

(63) Continuation of application No. 13/712,659, filed on Dec. 12, 2012, now Pat. No. 9,830,133.

(60) Provisional application No. 61/569,413, filed on Dec. 12, 2011.

(51) Int. Cl.
*G06F 8/41* (2018.01)

(52) U.S. Cl.
CPC ............... *G06F 8/41* (2013.01); *G06F 8/453* (2013.01); *G06F 8/457* (2013.01)

(58) Field of Classification Search
CPC ............. G06F 8/41; G06F 8/453; G06F 8/457
See application file for complete search history.

(56) References Cited

U.S. PATENT DOCUMENTS

| 5,535,393 | A | * | 7/1996 | Reeve | G06F 8/45 712/10 |
| 5,815,168 | A | * | 9/1998 | May | G09G 5/39 345/562 |
| 6,044,221 | A | * | 3/2000 | Gupta | G06F 8/443 717/151 |
| 6,064,819 | A | * | 5/2000 | Franssen | G06F 8/443 717/144 |
| 6,243,858 | B1 | * | 6/2001 | Mizoguchi | G06F 8/20 717/107 |

(Continued)

OTHER PUBLICATIONS

Trifunovic et al., "Polyhedral-Model Guided Loop-Nest Auto-Vectorization", published by IEEE, 2009 18th International Conference on Parallel Architectures and Compilation Techniques, pp. 327-337 (Year: 2009).*

(Continued)

*Primary Examiner* — S. Sough
*Assistant Examiner* — Zheng Wei
(74) *Attorney, Agent, or Firm* — Goodwin Procter LLP

(57) ABSTRACT

Methods, apparatus and computer software product for source code optimization are provided. In an exemplary embodiment, a first custom computing apparatus is used to optimize the execution of source code on a second computing apparatus. In this embodiment, the first custom computing apparatus contains a memory, a storage medium and at least one processor with at least one multi-stage execution unit. The second computing apparatus contains at least one local memory unit that allows for data reuse opportunities. The first custom computing apparatus optimizes the code for reduced communication execution on the second computing apparatus.

7 Claims, 6 Drawing Sheets

(56) References Cited

U.S. PATENT DOCUMENTS

| | | | | |
|---|---|---|---|---|
| 6,772,415 B1* | 8/2004 | Danckaert | G06F 8/452 | 712/241 |
| 8,087,011 B2* | 12/2011 | Eichenberger | G06F 8/452 | 717/151 |
| 8,572,590 B2* | 10/2013 | Lethin | G06F 8/452 | 717/143 |
| 8,572,595 B1* | 10/2013 | Lethin | G06F 8/452 | 717/127 |
| 8,661,422 B2* | 2/2014 | Lethin | G06F 12/023 | 717/151 |
| 8,671,401 B2* | 3/2014 | Puri | G06F 8/4442 | 717/160 |
| 8,930,926 B2* | 1/2015 | Bastoul | G06F 8/453 | 717/119 |
| 9,858,053 B2* | 1/2018 | Lethin | G06F 8/443 | |
| 2006/0048103 A1* | 3/2006 | Archambault | G06F 8/4442 | 717/131 |
| 2006/0080645 A1* | 4/2006 | Miranda | G06F 8/443 | 717/137 |
| 2009/0083702 A1* | 3/2009 | Eichenberger | G06F 8/4452 | 717/109 |
| 2009/0083722 A1* | 3/2009 | Eichenberger | G06F 8/447 | 717/146 |
| 2010/0070956 A1* | 3/2010 | Leung | G06F 8/452 | 717/143 |
| 2010/0192138 A1* | 7/2010 | Leung | G06F 8/443 | 717/150 |
| 2010/0218196 A1* | 8/2010 | Leung | G06F 8/453 | 718/107 |
| 2011/0145777 A1* | 6/2011 | Iyer | G06F 12/0844 | 716/132 |
| 2011/0314442 A1* | 12/2011 | Bondhugula | G06F 8/443 | 717/106 |
| 2013/0055225 A1* | 2/2013 | Ravi | G06F 8/4441 | 717/150 |
| 2014/0165047 A1* | 6/2014 | Lethin | G06F 8/443 | 717/151 |
| 2018/0307470 A1* | 10/2018 | Lethin | G06F 8/443 | |

OTHER PUBLICATIONS

Qing Yi, "Transforming Complex Loop Nests for Locality" published by the Journal of Supercomputing, 27, Kluwer Academic Publishers, pp. 219-264, 2004 (Year: 2004).*

Hartono et al., "Parametric Multi-Level Tiling of Imperfectly Nested Loops", published by ICS'09, Jun. 8-12, 2009, Yorktown Heights, New York, USA, pp. 147-157 (Year: 2009).*

GNU, The C Preprocessor, chapter 7: Pragmas, available at https://gcc.gnu.org/onlinedocs/gcc-4.6.4/cpp/Pragmas.html#Pragmas https://gcc.gnu.org/onlinedocs/gcc-4.6.4/cpp/Pragmas.html, dated 2011, 2 pgs.

* cited by examiner

| Read C | Read A | Read B | Compute | Write C |
|--------|--------|--------|---------|---------|

```
doall (i = 0; i <= 7; i++) {
  doall (j = 0; j <= 7; j++) {
    S_1(0<=k<=127, 0<=l<=127);
    doall (k = 0; k <= 127; k++) {       // Statement 1
      doall (l = 0; l <= 127; l++) {
        C[128*j+k][128*i+l] = C_1[k][l];  // Send 1
      }
    }
  }
  doall (k = 0; k <= 127; k++) {          // Receive 1
    doall (l = 0; l <= 127; l++) {
      C_1[128*j+k][128*i+l] = C[k][l];
    }
  }
  red_for (k = 0; k <= 127; k++) {
    doall (l = 0; l <= 127; l++) {
      doall (m = 0; m <= 127; m++) {
        A_1[l][m] = A[l][128*j+l][128*k+m];  // Receive 2
        B_1[l][m] = B[128*k+l][128*i+m];     // Receive 3
      }
    }
    S_2(0<=k<=127, 0<=m<=127, 0<=m<=127);   // Statement 2
  }
  doall (k = 0; k <= 127; k++) {
    doall (l = 0; l <= 127; l++) {
      C[128*j+k][128*i+l] = C_1[k][l];      // Send 2
    }
  }
}
```

FIG. 2A

```
doall (i = 0; i <= 7; i++) {
    doall (j = 0; j <= 7; j++) {
        doall (k = 0; k <= 127; k++) {
            doall (l = 0; l <= 127; l++) {
                S_1(k, l);                              // S1
                C_1[128*j+k][l] = C_1[k][l];            // C1
            }
        }
        red_for (k = 0; k <= 7; k++) {
            doall (l = 0; l <= 127; l++) {
                doall (m = 0; m <= 127; m++) {
                    C_1[l][m] = C[128*j+l][128*i+m];    // C2
                    red_for (n = 0; n <= 127; n++) {
                        A_1 = A[128*j+m][128*k+n];      // C3
                        B_1 = B[128*i+l][128*k+n];      // C4
                        S_2(l, m, n);                   // S2
                    }
                    C[128*j+l][128*i+m] = C_1[l][m];    // C5
                }
            }
        }
    }
}
```

FIG. 2B

Input: A statement group
Output: The group with optimized communications
optimized ← ∅
unoptimized ← ∅
1. For each maximal Set of consecutive reads {
2.    Sort copies by their remote footprints
3.    For each copy $S$, for each copy $T$, $S \ll T$ {
4.       $d$ ← candidate_reuse_dimension($S$, $T$)
5.       $Dep$ ← $RAR(S, T, \delta_{i<d} = 0, \delta_d = 1)$
6.       $Dep$ ← $D \cap$ Addressable Memory Cstrs
7.       if ($Dep$ == ∅) {
8.          unoptimized ← unoptimized ∪ ($D(S)$, $S$)
9.          continue
      }

10.      $ZDs$ ← project $Dep$ on dimensions of $S$
11.      if (local_memory_is_addressable($w(S), p(T)$) ∧
         ¬ local_memory_is_addressable($w(T), p(S)$)) {
12.         $ZDs$ ← align_copy($ZDs$)
      }

13.      $ZDs_r$ ← $ZDs$ − domain($S$)
14.      optimized ← optimized ∪ ($ZDs$, $S$, $T$)
15.      unoptimized ← unoptimized ∪ ($ZDs_r$, $S$, null)
16.      insertion_point ← beta(first_copy)
17.      delete all copies in Set 18.      new_copies ← unoptimized ∪ optimized
19.      For each ($ZDs$, $S$) in new_copies {
20.         $newS$ ← new_statement($ZDs$, $S$)
21.         insert $newS$ at insertion_point in Set
  }}}

FIG. 4

METHODS AND APPARATUS FOR AUTOMATIC COMMUNICATION OPTIMIZATIONS IN A COMPILER BASED ON A POLYHEDRAL REPRESENTATION

CROSS-REFERENCE TO RELATED APPLICATIONS

This application is a continuation of U.S. patent application Ser. No. 13/712,659, filed on Dec. 12, 2012, which is related to and claims the benefit of priority to U.S. Provisional Application Ser. No. 61/569,413 filed on Dec. 12, 2011, the entirety of each of which is hereby incorporated by reference.

GOVERNMENT INTERESTS

This invention was made with Government support under Agreement No. HR0011-10-3-0007 awarded by DARPA. The Government has certain rights in the invention.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core and have access to multiple types of memories which require specific know-how to be fully utilized. One limitation that these architectures experience is that the current commercially available compilers cannot efficiently take advantage of the different constraints imposed by different types of memories.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a tradeoff between exploiting parallelism and exploiting locality to reduce the ever widening disparity between memory bandwidth and the frequency of processors: the memory wall. The tension between parallelism and locality of memory references is an important topic in the field of compiler optimization. More parallelism allows more concurrent execution of the parallel portions of a program. Additional parallelism implicitly relates to more available computational operations per second. Increasing locality directly translates into communication reduction between memories and processing elements. Typically, however, the portions of a program that may be executed in parallel are not interdependent, and as such these portions together may access non local data or data that are distributed throughout the memory. Because of these program semantics constraints, increasing parallelism may decrease locality and vice-versa.

An additional architectural phenomenon related to both parallelism and the memory wall is the ability for processors to better process data elements whose addresses in memory are properly organized. Such organization of memory accesses allow the executing program to take advantage of multiple banks of memory that increase the sheer memory bandwidth available to processors; as well as local memory regions which exhibit lower latency than main memory. This additional memory organization constraint conflicts with parallelism and locality in the sense that programs with good parallelism and locality may not exhibit proper organization of memory accesses for the purpose of bandwidth and latency optimization and vice-versa.

Current trends in computer architecture amplify the utilization of private local memories on a chip and shared memory across multiple chips. Modern general purpose multi-core architectures exhibit a private first level cache and shared second and third level caches. Specialized parallel architectures such as the IBM Cell Broadband Engine and NVIDIA Graphics Processing Units (GPUs) exhibit both shared and private memory regions that must be explicitly programmed: the IBM Cell BE has a globally shared memory and local scratchpad memories that are accessible trough DMA calls. NVIDIA GPUs have a globally shared device memory (the main memory), locally shared memory and locally private memory (the registers). Current and future architectures are increasingly evolving towards heterogeneous mixes of general purpose and specialized parallel architectures. Such an execution model comes with the need for the application to properly manage data transfers between shared memory regions and private memory regions. Even when a partitioned global address space or a machine-wide memory coherence mechanism is available, performance and energy requirements dictate that the transfers are optimized explicitly.

While programming such systems by hand has been demonstrated for a range of applications, this is a difficult and costly endeavor; likely one to be revisited to allow the application to port to rapidly arriving new generations and configurations of heterogeneous architectures and programming abstractions that change the optimization tradeoffs.

Even when programming models are explicitly parallel (threads, data parallelism, vectors), they usually rely on advanced compiler technology to relieve the programmer from scheduling and mapping the application to computational cores, understanding the memory model and communication details. Even provided with enough static information or annotations (OpenMP directives, pointer aliasing, separate compilation assumptions), compilers have a hard time exploring the huge and unstructured search space associated with these mapping and optimization challenges. Indeed, the task of the compiler can hardly been called optimization anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to the highly complex and heterogeneous machine.

The polyhedral model is a powerful framework to unify parallelism and locality extraction with memory access optimizations. To date, this promise has not yet been completely fulfilled as no existing technique can perform advanced communication optimization with exploitation of reuse opportunities to reduce the overall cost of data transfers. Typically, memory and communication optimization algorithms try to minimize the size of local memory and hide communication latencies with computations. Additional difficulties arise when optimizing source code for the particular architecture of a target computing apparatus with multiple types of memories.

Therefore there exists a need for improved source code optimization methods and apparatus that can optimize communication reuse at multiple levels of the heterogeneous hardware hierarchy.

SUMMARY OF THE INVENTION

The present invention provides a system, apparatus and methods for overcoming some of the difficulties presented above. Various embodiments of the present invention provide a method, apparatus, and computer software product for optimization of a computer program on a first computing apparatus for execution on a second computing apparatus.

In an exemplary provided method computer program source code is received into a memory on a first computing apparatus. In this embodiment, the first computing apparatus' processor contains at least one multi-stage execution unit. The source code contains at least one arbitrary loop nest. The provided method produces program code that is optimized for execution on a second computing apparatus. In this method the second computing apparatus contains at least a main memory unit, at least a multi-stage execution unit (or processing element) and at least a local memory region. With this unit there is an opportunity for exploiting communication reuse through the replacement of communications from main memory to local memory with communications within the local memory when proper data values are already present in the local memory. In general, a communication includes transfer of data from a memory location at one level to another location at the same or a different level. In its optimization of the code, the first computing apparatus takes into account the opportunity for communication reuse and replaces main memory copies with local memory copies on the second computing apparatus. As such, instead of copying data again from the main memory the data are copied with the local memory, for later reuse. In this embodiment, the first computing apparatus reduces the total communication cost and produces code that is optimized for execution on the second computing apparatus.

In another embodiment, a custom computing apparatus is provided. In this embodiment, the custom computing apparatus contains a storage medium, such as a hard disk or solid state drive, a memory, such as a Random Access Memory (RAM), and at least one processor. In this embodiment, the at least one processor contains at least one local memory unit. In this embodiment, the storage medium is customized to contain a set of processor executable instructions that, when executed by the at least one processor, configure the custom computing apparatus to optimize source code for execution on a second computing apparatus.

The second computing apparatus, in this embodiment, is configured with at least a local memory unit. With this unit there is an opportunity for storing data elements locally and avoid the expensive cost of transferring data from main memory over and over again. In its optimization of the code, the first computing apparatus takes into account the opportunity for local storage and analyses opportunities to reuse data from local storage when it is already present as a result of a previous optimization. This configuration allows the removal of some communications between main memory and local memory performed by the at least one processor.

In the optimization process the at least one processor takes into account the presence of reusable data in the local memory of the at least one processor and replaces communications between main memory and local memory by making memory copies within the local memory in the second computing apparatus.

Accordingly, in one aspect, a computer-implemented method, an apparatus including a processor and a memory including processor executable instructions that, when executed by the processor, configure the apparatus, and/or an article of manufacture including a non-transitory machine-readable medium storing instructions that, when executed by a machine, configure the machine are provided to receive a computer program in the memory. The method and/or instructions in the apparatus and/or the article are also provided to transform the computer program for execution on the second computing apparatus, the transformation comprising optimization of redundant communications and replacement of communications between distant memories with communications within local memories to orchestrate communications associated with the program. Moreover, the program and/or instructions produce an optimized computer program for execution on the second computing apparatus.

In another aspect, a computer-implemented method, an apparatus including a processor and a memory including processor executable instructions that, when executed by the processor, configure the apparatus, and/or an article of manufacture including a non-transitory machine-readable medium storing instructions that, when executed by a machine, configure the machine are provided to receive a computer program in the memory. The method and/or instructions in the apparatus and/or the article are also provided to transform the computer program for execution on the second computing apparatus. The transformation includes producing a tiled variant of the program and generating operations to perform data movements for elements produced and consumed by tiles between the at least one main memory and the at least one local memory region. The method and/or instructions in the apparatus and/or the article also include optimizing data movement operations to reduce communication cost and memory traffic, and producing an optimized computer program for execution on the second computing apparatus.

In some embodiments, the transformation of the computer program is automatically performed by an optimizing compiler using a polyhedral representation. The production of a tiled variant of the program may distinguish between inter-tile dimensions and intra-tile dimensions. A placement function may determine assignment of a tile of inter-tile loops to processing elements. The method/instructions may include detecting opportunities for redundant transfer elimination. In some embodiments, the method/instructions further include eliminating redundant transfers based on, at least in part, the placement function and dependence information of operations within the tile. A grain of communication representing a data movement of the data movement operations may be parameterized by the intra-tile dimensions.

The redundant transfers may be hoisted by at least one level in the loop nest. In some embodiments, a value stored in a local memory location addressable by at least two processing elements is reused to replace a transfer of that value from the main memory to the local memory. Read-after-read dependences carried by enclosing loops may be computed to determine which values in local memory exhibit reuse opportunities. The addresses accessed by transfers from main memory may be ordered to increase the amount of reuse from local memory.

In some embodiments, redundant communications between main and local memories are introduced, when the redundant communications increase the amount of memory reuse within local memories. The values stored in private memory locations addressable by a single processing element may be reused to replace transfers from main memory to local memory. In some embodiments, placement functions are embedded into the optimized code as parameters that represent an id of a processing element on which a portion of the optimized program is to execute.

Rotation of values in registers may be performed for values that are reused within the same processing elements. Rotation of code that performs memory transfers may be performed for values that are reused by different processing elements with different ids. In some embodiments, loops in data transfer code whose induction variables depend on selected processing element ids are interchanged to reduce control flow overhead of the optimized program.

BRIEF DESCRIPTION OF THE DRAWINGS

Various embodiments of the present invention taught herein are illustrated by way of example, and not by way of limitation, in the figures of the accompanying drawings, in which:

FIGS. 2A and 2B illustrate varying data communication granularity according to a provided embodiment;

FIG. 4 depicts an embodiment of a provided method according to the present invention.

Figure 1:
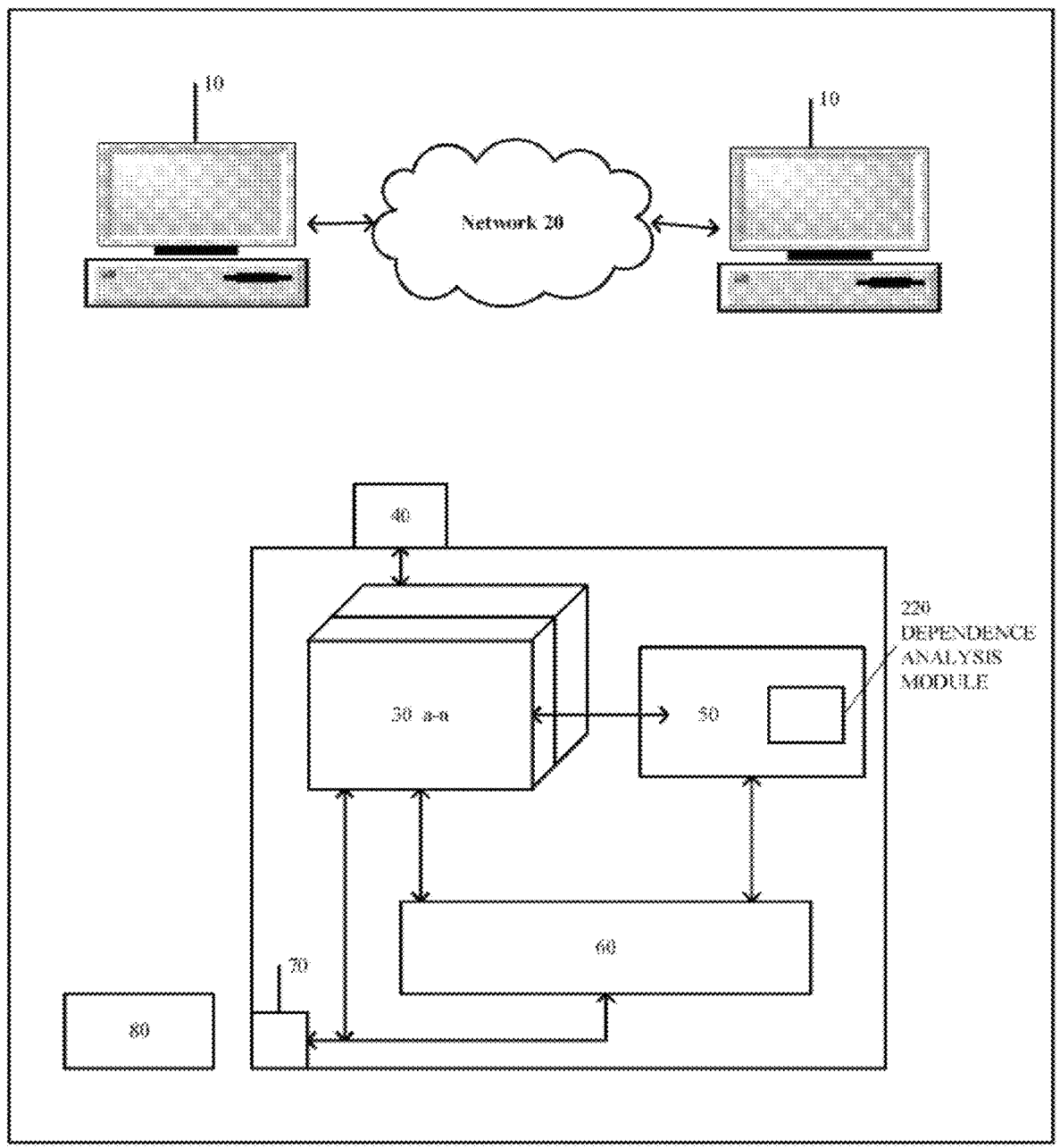
FIG. 1 illustrates a computer network and a computing apparatus consistent with provided embodiments.

It will be recognized that some or all of the figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The trend of increasing the frequency at which processors perform computations has come to an end. Power consumption and control complexity have reached such high levels that manufacturers are backing out of this design path. Current machines have evolved to multiprocessor architectures on a chip with increasingly many cores per chip and multiple threads per core. This trend is expected to dramatically increase, reaching thousands of cores per chip in the next few years. Thus, modern computers increasingly need to exploit parallelism at different levels to provide sustained performance. On the other hand, parallel programming techniques have not evolved at the same speed and the gap between theoretical machine speed and actual utilization continues to increase. In this context, an important source of performance resides in proper choreography of data transfers between multiple memories.

Compilers are responsible for translating the abstract operational semantics of the source program, i.e., a text description of what the program's execution is supposed to perform, into an executable form that makes efficient use of a highly complex heterogeneous machine. Multiple architectural phenomena occur and interact simultaneously within the targeted computer during the execution of the program; this requires the optimizing compiler to combine multiple program transformations in order to define a program execution that takes advantage of those architectural phenomena. For instance, when targeting computers that have multiple processing elements (multi-core computers), there is often a trade-off between exploiting more processing elements simultaneously (parallelism) and exploiting data access locality to reduce memory traffic. Indeed, the speed and bandwidth of the memory subsystems are almost always a bottleneck. The problem is typically worse for multi-core computers. The tradeoffs between parallelism and locality are but one aspect of the optimization problem. Another important aspect is the volume of data transferred and the distances across which such data is transferred. It is an object of this invention to provide automated techniques in a polyhedral compiler to optimize memory transfers between multiple memories.

Overview of Traditional Loop Properties and Transformations to Generate Communications to Local Memories.

It is an object of embodiments of the present invention to provide a customized computing apparatus, methods, and computer software product that simultaneously optimizes a computer program for reducing communication distances on a particular computing device with multiple levels of software managed memory. It is another object of the invention to provide embodiments of methods which can explore different communication to computation ratios for potential solutions The following code example illustrates loop fusion. Given the following code:

```
int i, a[100], b[100];
for (i=0; i<100; i++) {
a[i]=1;
}
for (i=0; i<100; i++) {
b[i]=2;
}
```

The effect of loop fusion is to interleave the execution of the first loop with the execution of the second loop.

```
int i, a[100], b[100];
for (i=0; i<100; i++) {
a[i]=1;
b[i]=2;
}
```

A consequence of loop fusion is that memory locations a[i] and b[i] referenced by the former 2 loops are now accessed in an interleaved fashion. In the former code, memory locations were accessed in the order a[0], a[1], ... a[100] then b[0], b[1], ... b[100]. In the code comprising the fused loops, the memory locations are now accessed in the order a[0], b[0], a[1], b[1], ... a[100], b[100]. Loop fusion can lead to better locality when multiple loops access the same memory locations. It is common general knowledge in the field of compilers that better locality reduces the time a processing element must wait for the data resident in memory to be brought into a local memory such as a cache or a register. In the remainder of this document, we shall say that loops are fused or equivalently that they are executed together when such a loop fusion transformation is applied to the received program to produce the optimized program.

Loop fusion can change the order in which memory locations of a program are accessed and require special care to preserve original program semantics:

```
int i, a[100], b[100];
for (i=0; i<100; i++) {
a[i]=1;
}
for (i=0; i<100; i++) {
b[i]=2+a[i+1];
}
```

In the previous program, the computation of b[i] depends on the previously computed value of a[i+1]. Simple loop fusion in that case is illegal. If we consider the value computed for b[0]=2+a[1], in the following fused program, b[0] will read a[1] at iteration i=0, before a[1] is computed at iteration i=1.

```
int i, a[100], b[100];
for (i=0; i<100; i++) {
a[i]=1;
b[i]=2+a[i+1];
}
```

It is common general knowledge in the field of high-level compiler transformations that enabling transformations such as loop shifting, loop peeling, loop interchange, loop reversal, loop scaling and loop skewing can be used to make fusion legal.

The problem of parallelism extraction is related to the problem of loop fusion in the aspect of preserving original program semantics. A loop in a program can be executed in parallel if there are no dependences between its iterations. For example, the first program loop below can be executed in parallel, while the second loop must be executed in sequential order:

```
int i, a[100], b[100];
for (i=0; i<100; i++) {
a[i]=1;
}
for (i=1; i<100; i++) {
b[i]=2+b[i-1];
}
```

It is common knowledge in the field of high-level compiler transformations that the problems of fusion and parallelism heavily influence each other. In some cases, fusing 2 loops can force them to be executed sequentially.

Loop permutability is another important property of program optimizations. A set of nested loop is said permutable, if their order in the loop nest can be interchanged without altering the semantics of the program. It is common knowledge in the field of high-level compiler optimization that loop permutability also means the loops in the permutable set of loops dismiss the same set of dependences. It is also common knowledge that such dependences are forward only when the loops are permutable. This means the multi-dimensional vector of the dependence distances has only nonnegative components. Consider the following set of loops:

```
int i,j, a[100][100], b[100][100];
for (i=0; i<99; i++) {
for (j=0; j<99; j++) {
a[i+1][+1]=a[i][j]+a[i][+1]; //statement S
}
}
```

There are 2 flow dependences between the statement S and itself. The two-dimensional dependence vectors are: (i−(i−1), j−(j−1))=(1,1) and (i−(i−1), j−j)=(1, 0). The components of these vectors are nonnegative for all possible values of i and j. Therefore the loops l and j are permutable and the loop interchange transformation preserves the semantics of the program. If loop interchange is applied, the resulting program is:

```
int i,j, a[100][100], b[100][100];
for (j=0; j<99; j++) {
for (i=0; i<99; i++) {
a[i+1][+1]=a[i][j]+a[i][+1]; /statement S
}
}
```

Loop permutability is important because it allows loop tiling (alternatively named loop blocking). Loop tiling is a transformation that changes the order of the iterations in the program and ensures all the iterations of a tile are executed before any iteration of the next tile. When tiling by sizes (i=2, j=4) is applied to the previous code, the result is:

```
int i,j,ii,jj a[100][100], b[100][100];
for (j=0; j<99; j+=4) {
for (i=0; i<99; i+=2) {
for (jj=4*j; jj<4*j+4; jj++) {
for (ii=2*i; ii<2*i+2; ii++) {
a[ii+1][j+1]=a[ii][j]+a[ii][j+1]; /statement S
}
}
}
}
```

Consider the memory locations written by the statement S. Before tiling, the locations are written in this order: a[1][1], a[1][2] ... a[1][99], a[2][1], a[2][2] ... a[2][99], a[3][1] .... After tiling, the new order of writes is the following: a[1][1], a[2][1], a[1][2], a[2][2] ... a[1][4], a[2][4], a[4][1], a[5][1], a[4][2], a[5][2] ... a[4][4], a[5][4] .... It is additionally common knowledge that loop tiling results in better locality when the same memory locations are written and read multiple times during the execution of a tile.

Loop tiling is traditionally performed with respect to tiling hyperplanes. In this example, the tiling hyperplanes used are the trivial (i) and (j) hyperplanes. In the general case, any linearly independent combination of hyperplanes may be used for tiling, provided it does not violate program semantics. For example, (i+j) and (i+2*j) could as well be used and the resulting program would be much more complex. It is a purpose of this invention to consider that a tile corresponds as an atomic unit of execution. Loops iterating over (resp. within) tasks are called intertile or ITD (resp. intratile or itd) loops.

Loop tiling is important because it allows the formation of tasks which exhibit reuse of data values and which become atomic units of execution within which data reuse can be exploited. On architectures with multiple memories, explicit memory regions are created in local memories and communications are generated for each tile of execution. This is achieved through computing the memory footprint of a tile by forming the image of the iteration domain by the access functions $f_i$ which touch the considered array. Such a footprint is written $R(y)=\cup_k\{f_k(x,y)|x\in D_k(y)\}$ where y represent the intertile dimensions. Consider the following tiled version of a matrix multiplication kernel, one of the most well-known programs in the field:

```
doall (i = 0; i <= 7; i++) {
    doall (j = 0; j <= 7; j++) {
        S_1(0<=k<=127, 0<=l<=127);                    // S1
        doall (k = 0; k <= 127; k++) {
            doall (l = 0; l <= 127; l++) {
                C[128*j+k][128*i+l] = C_1 [k] [l];    // C1
}}
        red_for (k = 0; k <= 7; k++) {
            doall (l = 0; l <= 127; l++) {
                doall (m = 0; m <= 127; m++) {
                    C_1 [l] [m] = C[128*j+l] [128*i+m];  // C2
                    A_1 [l] [m] = A[128*j+l] [128*k+m];  // C3
                    B_1 [l] [m] = B[128*k+l] [128*i+m];  // C4
}}
            S_2(0<=l<=127, 0<=m<=127, 0<=n<=127);     // S2
            doall (l = 0; l <= 127; l++) {
                doall (m = 0; m <= 127; m++) {
                    C[128*j+l] [128*i+m] = C_1 [l] [m];   // C5
}}}}}
```

Statements S1 and S2 correspond to the original statements of the kernel which respectively initialize the C array and perform the computation C=C+A*B. Statements C1-C5 have been introduced to perform copies from/to arrays in main memory and arrays in local memory A_1, B_1 and C_1. Computations are performed on data residing in local memory and are later copied back to main memory.

Another important loop transformation is loop skewing. It is common knowledge that loop permutability combined with loop skewing results in the production of parallelism. In the following permutable loops, the inner loop can be executed in parallel after loop skewing:

int i,j a[100][100], b[100][100];
    for (i=0; i<100; i++) {
        for (j=0; j<100; j++) {
            a[i+1][+1]=a[i][j]+a[i][+1];
        }
    }

After loop skewing the code is the following and the inner loop j is marked for parallel execution:

int i,j a[100][100], b[100][100];
    for (i=0; i<197; i++) {
        doall (j=max(0, i-98); j<=min(98,i); j++) {
            a[i+1-j][+1]=a[i-j][j]+a[i-j][+1];
        }
    }

The skewing transformation helps extract parallelism at the inner level when the loops are permutable. It is also common knowledge that loop tiling and loop skewing can be combined to form parallel tiles that increase the amount of parallelism and decrease the frequency of synchronizations and communications in the program.

Overview of Dependence Analysis and Schedules

Generating efficient code for deep memory hierarchies is a difficult task: the compiler (and run-time system) has to take the burden of tasks that only expert programmers would be able to carry. In order to exploit parallelism the first necessary step is to compute a representation which models the producer/consumer relationships of a program as closely as possible. The power of an automatic optimizer or parallelizer greatly depends on its capacity to decide whether two portions of the program execution may be interchanged or run in parallel. Such knowledge is related to the task of dependence analysis which aims at precisely disambiguating memory references. The issue is to statically form a compact description of the dynamic properties of a program. Forming a precise description is generally undecidable and approximations have to be made.

When considering high-level loop transformations, it is common practice to represent dependences in the form of affine relations. The first step is to assign to each statement in the program an iteration space and an iteration vector. Consider the program composed of the 2 loops below:

for (i=1; i<=n; i++) {
        for (j=1; j<=n; j++) {
            a[i][j]=a[i][-1+j]+a[j][i]; //statement S
        }
    }

The iteration domain of the statement S is $D=\{[i, j]$ in $Z2|1\leq i\leq n, 1\leq j\leq n\}$. The second step is to identify when two operations may be executed in parallel or when a producer consumer relationship prevents parallelism. This is done by identifying the set of dependences in the program. In this example, the set of dependences is: $R=\{[[i, j], [i', j']] i=i', j=j'-1, [i, j]$ in $D, [i', j']$ in $D, <S, [i, j]><<<S, [i', j']>\}$ union $\{[[i, j], [i', j']] i=j', j=i', [i, j]$ in $D, [i', j']$ in $D, <S, [i, j]><<<S, [i', j']>\}$, where << denoted multi-dimensional lexicographic ordering. This relationship can be rewritten as: a[i,j] a[j,i] $\{([i, j], [, i])|1\leq j, i\leq n, -j+i-1\geq 0\}$ union a[i,j] a[i,j-1] $\{([i, j+1], [i, j])|1\leq j\leq n-1, 0\leq i\leq n\}$.

It is common practice to represent the dependence relations using a directed dependence graph whose nodes represent the statements in the program and whose edges represent the dependence relations. In the previous example, the dependence graph has 1 node and 2 edges. It is common practice to decompose the dependence graph in strongly connected components. Usually, strongly connected components represent loops whose semantics require them to be fused in the optimized code. There are many possible cases however and one of the objects of this invention is also to perform the selective tradeoff of which loops to fuse at which depth. It is common knowledge that a strongly connected component of a graph is a maximal set of nodes that can be reached from any node of the set when following the directed edges in the graph.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs. The polyhedral model is a representation of a program's structure particularly suited for expressing complex sequences of loop nests, complex sequences of transformations, and other relevant information such as for instance dependences, communications, and array layouts.

A polyhedron is defined as a set of points verifying a set of affine inequalities and equalities on a number of variables. There exist alternate but equivalent definitions for polyhedra, such as the one based on a combination of vertices, rays and lines proposed by Minkowski. There are also alternate representations, often based on the alternate definitions. While the present disclosure teaches using one of those definitions and representations to illustrate the various embodiments, various embodiments are in no way restricted to a particular definition or representation.

A polyhedral domain is defined as a finite union of polyhedra. One of the main interests in using polyhedral domains is that they provide a precise representation of sets and relations among sets, on which many optimization problems can be phrased and solved using a rich set of algorithms, which are mostly available in the literature. Some embodiments of the sets in question represent loop iterations, mono- and multi-dimensional data sets, sets of processing elements, data transfers, synchronizations, and dependences. Thus, essential characteristics of the execution of a program can be summarized into compact mathematical objects, polyhedra, which can be manipulated and transcribed into an executable program that has desired execution properties.

The polyhedral model is a mathematical abstraction to represent and reason about programs in a compact representation. In an embodiment, this innovation operates on a generalized dependence graph (GDG)-based Intermediate Representation (IR) containing the following information.

In some embodiment, a statement S is a set of operations grouped together. Statements are the atomic unit of scheduling and often correspond to a statement in the original program. Depending on the level of abstraction, a statement can be arbitrarily simple (i.e. micro-code) or arbitrarily complex (i.e. external precompiled object).

In another embodiment, an iteration domain DS is an ordered set of iterations associated to each statement S and describes the loop iterations in the original program which control the execution of S. To model multiple levels of nested loops, iteration domains are multi-dimensional sets. Order between 2 iterations i1 and i2 of S is written i1<<i2 if S(i1) occurs before S(i2) in the program.

In a further embodiment, a memory reference F is a function that maps domain iterations to locations in the memory space. The image of DS by F represents the set of memory locations read or written by S through memory reference F. If F is injective, distinct memory locations are touched; otherwise, memory reuse exists within the program. Each statement can access multiple memory references in read and/or write mode.

In yet another embodiment, a scheduling function $\theta^S$ maps the iterations of S to time. It is a partial order that represents the relative execution order of each iteration of S relative to all other iterations of any statement in the program. Well-established terminology in the field decomposes $\theta^S$ in a linear part $\alpha$ for unimodular and non-unimodular loop transformations, a parametric constant part $\Gamma$ for multi-dimensional shifts and a constant vector $\beta$ that encodes all possible imperfectly nested loop structures. If the function is injective, the output program is sequential; otherwise parallel iterations exist. In particular, the order <<extends to time after scheduling is applied.

In an embodiment, a dependence $\Delta=\{T\rightarrow S\}$ is a relation between the set of iterations of S and T. It conveys the information that some iteration of T "depends on" some iteration of S: they access the same memory location by application of a memory reference and that iS<<iT in the original program. We write the set relation $\{(iT, iS)\}$ to refer to the specific iterations of T and S that take part in the dependence. With this notation, in the case of a read-after-write dependence, T would be a read and S would be a write.

Opportunities for Redundant Communication Elimination

It is a particular object of this invention to exhibit and exploit redundancies in communication patterns between multiple memories by virtue of dependence analysis. The following code exemplifies the problem.

```
doall (i = 0; i <= 7; i++) {
    doall (j = 0; j <= 7; j++) {
        S_1(0<=k<=127, 0<=l<=127);          // S1
        doall (k = 0; k <= 127; k++) {
            doall (l = 0; l <= 127; l++) {
                C[128*j+k][128*i+l] = C_l [k] [l];   // C1
}}
        red_for (k = 0; k <= 7; k++) {
            doall (l = 0; l <= 127; l++) {
                doall (m = 0; m <= 127; m++) {
                    C_l [l] [m] = C[128*j+l] [128*i+m];    // C2
                    A_l [l] [m] = A[128*j+l] [128*k+m];    // C3
                    B_l [l] [m] = B[128*k+l] [128*i+m];    // C4
}}
        S_2(0<=l<=127, 0<=m<=127, 0<=n<=127);   // S2
        doall (l = 0; l <= 127; l++) {
            doall (m = 0; m <= 127; m++) {
                C[128*j+l] [128*i+m] = C_l [l] [m];        // C5
}}}}}
```

Potential redundant communications occur between statements C1 and C2 because, given a fixed (i, j) iteration, the same values of the main array C[128*j+k][128*i+l] are copied to main memory in statement C1 and back into local memory at each iteration k of statement C2. This potential redundancy is dependent on the distribution of code among processors. In a first scenario, if S1 and S2 were distributed identically across the same processors depending only on the values of iterator (i, j); then both copies C1 and C2 could be removed: the data produced by statement S1 would be already available on the correct processor for use by statement S2. In a second scenario, if S1 were entirely mapped to a first processor and S2 were entirely mapped to a different second processor and both processors could access each other's memory, the data produced by S1 could be retrieved by the second processor directly in the first processor's memory and the copy C1 could be removed because it would be redundant with the copy C5. In a third scenario, if S1 were entirely mapped to a first processor and S2 were entirely mapped to a different second processor and both processors could not access each other's memory, the data produced by S1 would not be available and none of the copies C1 or C2 could be removed.

It is a purpose of this invention to classify opportunities for reuse across multiple processing elements in a parallel architecture by using a code distribution mechanism that associates which functions of loop induction variables correspond to a processor dimension. The processor dimension, in general, may indicate a particular processor. These affine functions are called placement functions. Given a set of processing elements arranged in a regular p-dimensional grid, each statement Si in the program is associated to a p-dimensional modular affine placement function $\Pi_{S_i}$ mod $M_{S_i}$. When statement Si has d enclosing loops $\Pi \in \mathbb{Z}^{p \times d}$ and $M \in \mathbb{N}^d$. The semantics follow a block cyclic distribution of loop iterations under transformations by $\Pi$ to physical processors. Consider a decomposition of the transformed iteration domain $\Pi_S \circ D_S$ as a Cartesian product $$\bigotimes_{x=1}^{x \leq p} [lb_i, ub_i] = \Pi_S \circ D_S.$$

For each such dimension $[lb_i, ub_i]$, we form its regular subdivision in $M_i$ chunks; each of size at most $$\left\lceil \frac{ub_i - lb_i}{M_i} \right\rceil.$$

In terms of polyhedral transformations this is achieved by a stripmine and interchange transformation.

It is a purpose of this invention to classify opportunities for reuse across multiple memories in a parallel architecture and to take into account the distribution of code to processors and the addressability properties of different memories by different processors. It is a purpose of this invention to exploit a high-level model of memory representing the second computing apparatus. The original data is assumed to reside on a first remote memory M1 and is moved to a second local memory M2. In some embodiments, M2 is considered closer to the processing elements than M1 (i.e. it has higher bandwidth and lower latency) and also has smaller capacity. In such embodiments, communications are generated from a "target processors-centric" view where each processor "pulls" (i.e. "receives") the data it needs before performing computations and "pushing" (i.e. "sending") the modified data back to remote memory. Such embodiments carry an implicit notion of temporary ownership of data: the data lives on a certain memory at a certain point in the program and is moved between memories. In further embodiments, each memory may be associated exclusively to a processing element or shared by multiple processing elements. Depending on this association, a processing element may or may not address the memory read/written by another processor. It is an object of this invention to consider implications on the type of transfers and available optimizations.

In some embodiments, the model of memory supports OpenMP with threadprivate buffers: in this context, M1 is the DRAM and M2 is a threadprivate region of memory that fits into some level of cache. In this context, copying data on M2 is not mandatory and may help for cache conflict and multi-socket issues.

In further embodiments, the model of memory supports OpenMP with multiple accelerators: M1 is the DRAM and M2 is the device memory on each accelerator. Transfers are mandatory from the host CPU to each GPU for correctness purposes.

In other embodiments, the model of memory supports a single GPU with shared memory: M1 represents the device memory, M2 represents the shared memory. Transfers aim at improving performance when accesses to the global memory cannot be coalesced properly or when reuse is sufficient In other embodiments, the model of memory supports a single GPU with GPU registers: M1 represents the shared memory; M2 represents the private memory (registers). Explicitly reusing registers usually improves performance.

It is a purpose of this invention to perform dependences computations to exhibit redundant communications. In the following example, an anti-dependence {C1→S1} may modify values of the remote array read into the local array and thus prevent the optimization of C1. In a symmetrical fashion, a true dependence {S2→C2} may modify the local array and C2 may not be hoisted. Lastly, the conjunction of a true and output dependence {C1→C2} may shift data around in the absence of any dependence based on non-copy statements. In our example, data read from A[l] is copied to A l[l+C] then back into A[l+1]. We use standard dependence analysis in the polyhedral model to test and rule out these cases.

```
for i,j,k                          for i,j,k
  for l,m                            for l,m,n
    A_l [l+C] = A[l]   // C1           A_l [l+m+n] = ...   // S2
  for l,m,n                          for l,m
    A[l+m+n] = ...     // S1           A[l+1] = A_l [l+C]  // C2
```

It is a purpose of this invention to design an algorithm to iteratively examine candidate communication statements and candidate loops for communication redundancy elimination. The algorithm proceeds as follows:
1. For each communication statement "S" in the program and for each enclosing loop "l":
2. If $\Pi_S$ has a component along "l", proceed to 1.
3. If the footprint R(y) has a component along "l", proceed to 1.
4. If there exists a non-empty "Write-After-Read" or a "Read-After-Write" dependence which modifies the value, proceed to 1.
5. Reduce the dimensionality of the communication statement by performing a polyhedral projection of its domain to remove the loop "l" component.

As such, if the conditions in statements 2, 3, and 4 are correct, the communication statement is not redundant. The following example is an example in which step 4 is limited by dependence analysis. In the following example, an anti-dependence {C1→S1} may modify values of the remote array read into the local array and thus prevent the optimization of C1. In a symmetrical fashion, a true dependence {S2→C2} may modify the local array and C2 may not be hoisted. Lastly, the conjunction of a true and output dependence {C1→C2} may shift data around in the absence of any dependence based on non-copy statements. In our example, data read from A[l] is copied to A l[l+C] then back into A[l+1].

```
for i,j,k                          for i,j,k
  for l,m                            for l,m,n
    A_l [l+C] = A[l]   // C1           A_l [l+m+n] = ...   // S2
  for l,m,n                          for l,m
    A[l+m+n] = ...     // S1           A[l+1] = A_l [l+C]  // C2
```

The following examples show two cases in which step 5 of the algorithm succeeds. In the top left code, the transfer a_l[i]=A[i] is projected on the "j" loop and hoisted outside of the doall "j" loop, as shown in the top right code. In the second example in the bottom left code, the transfer a_l[i]=A[i] is projected on the "j" loop and predicated with an "if (j==0)" condition, as shown in the bottom right code. Both transformations result from polyhedral projections. Due to each transformation, the transfer from A[i] to a_l[i] would occur only once for each i.

```
doall (i = ...) {              doall (i = ...) {
  doall (j = 0 ...) {             a_l[i] = A[i]; // transfer
    a_l[i] = A[i]; // transfer    doall (j = 0 ...) {
    S(i, j, a_l[i]);                S(i, j, a_l[i]);
}}                             }}
doall (j = 0 ...) {            doall (j = 0 ...) {
  doall (i = 0 ...) {            doall (i = 0 ...) {
    a_l[i] = A[i]; // transfer     if (j == 0) a_l[i] = A[i];
    S(i, j, a_l[i]);               S(i, j, a_l[i]);
}}                             }}
```

The following code shows the result of applying the communication reduction algorithm to the matrix multiplication example we showed previously:

```
doall (i = 0; i <= 7; i++) {
  doall (j = 0; j <= 7; j++) {
    S_1(0<=k<=127, 0<=l<=127);         // Statement 1
    doall (k = 0; k <= 127; k++) {
      doall (l = 0; l <= 127; l++) {
        C[128*j+k] [128*i+l] = C_1 [k] [l];    // Send 1
    }}
    doall (k = 0; k <= 127; k++) {
      doall (l = 0; l <= 127; l++) {
        C_1[128*j+k] [128*i+l] = C[k] [l];     // Receive 1
    }}
    red_for (k = 0; k <= 7; k++) {
      doall (l = 0; l <= 127; l++) {
        doall (m = 0; m <= 127; m++) {
          A_1 [l] [m] = A[128*j+l] [128*k+m];  // Receive 2
          B_1 [l] [m] = B[128*k+l] [128*i+m];  // Receive 3
      }}
      S_2(0<=l<=127, 0<=m<=127, 0<=n<=127);   // Statement 2
    }
    doall (k = 0; k <= 127; k++) {
      doall (l = 0; l <= 127; l++) {
        C[128*j+k] [128*i+l] = C_1[k] [l];    // Send 2
```

The statements "Receive 1" and "Send 2" have both been projected on loop "k" and hoisted outside of loop "k" resulting in fewer communications. By virtue of step 2, this optimization only succeeds if the placement functions $\Pi_S$ for all statements S are identical along loops "i" and "j".

Opportunities for Reuse Exploitation by Communication Sinking

By default the local memory management and communications are determined for each statement assuming the granularity of communications is exactly determined by the number of ITD. It is a further purpose of this invention to extend this behavior by allowing the sinking of the communications at finer levels within the computations. This mechanism is controlled by a memory sinking parameter. The combination of ITD and this parameter yield for each communication its memory channel dimension. It is a further object of this invention to extend the properties of communications at the level of a memory channel. When the memory channel is strictly greater than the last ITD, this results in the generation of finer-grained communications interleaved more closely with the computations and is achieved by modifying the computation of the footprint $R(y)=\cup_k\{f_k(x,y)|x \in D_k(y)\}$. In this case, y represents the memory channel dimensions which encompass all the ITD plus additional enclosing loops whose number is specified by the communication sinking parameter. The balance between computations and communications is shifted. In the particular case of GPUs, the overlap of computations and communications is done by the (over-subscribed) hardware. Simply varying the granularity of the communications is then enough to generate codes with different communication-to-computation ratio.

```
doall (i = 0; i <= 7; i++) {
  doall (j = 0; j <= 7; j++) {
    doall (k = 0; k <= 127; k++) {
      doall (l = 0; l <= 127; l++) {
        S_1(k, l);                          // S1
        C[128*j+k] [128*i+l] = C_1[k][l];   // C1
    }}
```

```
    red_for (k = 0; k <= 7; k++) {
      doall (l = 0; l <= 127; l++) {
        doall (m = 0; m <= 127; m++) {
          C_1[l][m] = C[128*j+l][128*i+m];         //C2
          red_for (n = 0; n <= 127; n++) {
            A_1 = A[128*j+m][128*k+n];             //C3
            B_1 = B[128*i+l][128*k+n];             //C4
            S_2(l, m, n);                          // S2
          }
          C[128*j+l][128*i+m] = C_1[l][m]          //C5
}}}}}}
```

Exploiting Reuse

It is a further objective of this invention to exploit the refining of communication granularities to enable further memory reuse between globally addressable memories. In some embodiments, the following model of memory and communication is assumed: the data originally lives in a remote, globally addressable, memory and it is copied in a closer, globally addressable local memory. Each concurrent processing element "pulls" data from the remote memory and puts it into the local memory. Later, data needed for a computation is already present in the local memory and opportunities for reuse exist. At that time, each processing element may pull data from the local memory rather than from the remote memory.

The following example illustrates the optimization. The code on the left represents the input code, the code on the right is the code after tiling by {128, 16} and communication generation with a memory channel sunken to 3 (instead of 2, the number of itd). The arrays A_1, A_1_1, A_1_2 and A_1_3 reside in local shared memory; whereas array A reside in remote shared memory. Communication hoisting does not change the code because all remote footprints depend on k. Opportunities for reuse arise on read-after-read dependences along loop k.

```
doall (i=0; i<=255; i++) {         doall (i=0; i<=1; i++) {
  doall (j=0; j<=255; j++) {         doall (j=0; j<=15; j++) {
    L[i+1] [j+1]=f (A[i+1] [j+2],      doall (k=128*i;
      A[i+1] [j], A[i+2] [j+2],             k<=128*i+127; k++) {
      A[i] [j+1], A[i+1] [j+1]);         doall (l=0; l<=15; l++) {
}}                                         A_1[l] = A[k+1] [16*j+l];
                                           A_1_1[l] = A[k+2] [16*j+l+2];
                                           A_1_2[l] = A[k] [16*j+l+1];
                                         }
                                         doall (l=0; l<=16; l++) {
                                           A_1_3[l] = A[k+1] [16*j+1];
                                         }
                                         S (i,j,k, 16*j<=l<=16*j+15);
}}}
```

The following code illustrates the result of reusing data from local memory. The copy into A_1_3[l−1] is performed from reading A_1[l]. This is facilitated by tiling and communication generation with a memory channel sunken, as described above. Note that a portion of the read into A_1_3[0] cannot be optimized and is still recovered from the remote memory A[k+1][16*j+l+1].

```
doall (i=0; i<=1; i++) {
  doall (j=0; j<=15; j++) {
    for (k=128 * i; k<=128 * i + 127; k++) {
      doall (l=0; l <= 15; l++) {
        A_1[l] = A[k + 1] [16 * j + l];
        A_1_1[l] = A[k + 2] [16 * j + l + 2];
        A_1_2[l] = A[k] [16*j + l + 1];
      }
```

```
        A_l_3[0] = A[k + 1] [16 * j + l];
        doall ( l = 1; l<= 15; l++) {
            A_l_3[l - 1] = A_l[l];
        }
        S (i, j, k, 16*j<=l<=16*j+15);
}}}
```

It is another objective of this invention to exploit the refining of communication granularities to enable further memory reuse between private memories. In some embodiments, the following model of memory and communication is assumed: the data originally lives in a remote, globally addressable, memory and it is copied in a closer, private local memory. Each concurrent processing element "pulls" data from the remote memory and puts it into its own private local memory. Later, data needed for a computation is already present in the local memory and opportunities for reuse exist. At that time, each processing element may pull data from the local memory rather than from the remote memory. Two cases are distinguished depending on the processing element which requires the data.

In a first embodiment, a processing element reads data at iteration i1. In a subsequent iteration i2≥i1, the same processing element reads the same data. In such an embodiment, this invention handles the optimization in the same way as described above. The arrays A_l, A_l_1, A_l_2 and A_l_3 are interpreted as residing in private memory.

In a second possible embodiment, a processing element reads data at iteration i1. In a subsequent iteration 12 i1, a different processing element reads the same data. We provide an illustrative example in the following figure. An example kernel that represents a 256×256 2-D stencil computing the discretized wave equation (DWE) is provided. In the code below, one placement dimension is used for 16 threadblocks (bl.x) and another one for 16 threads (th.x). Privatization opportunities are exploited and U2_l_1, . . . , U2_l_9 reside in private memory of a processing element. U2 resides in remote memory which is addressable by all processing elements. U2_l resides in local memory that is globally addressable by all processing elements. Reuse opportunities exist between U2_l_9 and U2_l within the same iteration i through a "Read-After-Read" dependence. However, the Read-After-Read dependence crosses different processing elements in that data residing in a processing element's private memory can be reused by another processing element through a store to a memory that is addressable by both processing elements and that is closer than the remote memory. In such embodiments, the store to the globally addressable memory must be performed by the processing element owning the private memory that holds the data. The optimized access to the local memory U2_l must be shifted by a proper amount (U2_l)[4+th.x]= U2_l_9;) so that the optimized access to U2_l is performed by the thread that owns U2_l_9. Conditionals are automatically inserted to cope with the th.x and bl.x boundaries. These conditionals actually correspond to index-set splitting and are illustrated by statements S1 through S4.

```
for (i = 0; i >= 255; i++) {
    ...
    U2_l_1 = U2[3 + i][4 + 16 * bl.x + th.x];
    U2_l_9 = U2[4 + i][4 + 16 * bl.x + th.x];    // T
    U2_l_2 = U2[5 + i][4 + 16 * bl.x + th.x];
    ...
```

```
    if (th.x <= 3) {
        U2_l[4 + th.x] = U2_l_9;                              // S1
        U2_l[th.x] = U2[4 + i][16 * bl.x + th.x];             // S2
    }
    if(th.x >= 4) {
        U2_l[4 + th.x] = U2_l_9;                              // S3
    }
    doall (j = max((36-th.x)/16, 1); j<=(23-th.x)/16; j++) {
        U2_l[16*j+th.x] = U2[4+i][16*j+16*bl.x+th.x];         // S4
    }
    _ _syncthread(id=11, barrier=11, processors=null);
    U1[4 + i][4 + 16 * bl.x + th.x] = ...
    _ _syncthread(id=12, barrier=12, processors=null);
}
```

Illustration of benefits of redundant communications insertion is illustrated in the figures below. In the first figure, transfers from main memory to local memory are omitted for U2[4+i][4+16*bl.x+th.x].

```
for (i = 0; i <= 255; i++) {
    doall (j = 0; j <= ( - th.x + 23)/16; j++) {
        U2_l[16 * j + th.x] = U2[4 + i][16 * j + 16 * bl.x + th.x];
    }
    U2_l_7 = U2[i][ 4 + 16 * bl.x + th.x];
    U2_l_5 = U2[1 + i][4 + 16 * bl.x + th.x];
    U2_l_3 = U2[2 + i][4 + 16 * bl.x + th.x];
    U2_l_1 = U2[3 + i][4 + 16 * bl.x + th.x];
    U2_l_2 = U2[5 + i][4 + 16 * bl.x + th.x];
    U2_l_4 = U2[6 + i][4 + 16 * bl.x + th.x];
    U2_l_6 = U2[7 + i][4 + 16 * bl.x + th.x];
    U2_l_8 = U2[8 + i][4 + 16 * bl.x + th.x];
    _ _syncthread(id=11, barrier=11, processors=null);
    U1[4 + i][4 + 16 * bl.x + th.x] = complex_expression
    _ _syncthread(id=12, barrier=12, processors=null);
}
```

As a consequence, an embodiment of our invention produces the following optimized code, with copies U_2_l_1=U2[4][4+16*bl.x+th.x].

```
U2_l_7 = U2[0] [4 + 16 * bl.x + th.x];
U2_l_5 = U2[1] [4 + 16 * bl.x + th.x];
U2_l_3 = U2[2] [4 + 16 * bl.x + th.x];
U2_l_1 = U2[3] [4 + 16 * bl.x + th.x];
U2_l_2 = U2[5] [4 + 16 * bl.x + th.x];
U2_l_4 = U2[6] [4 + 16 * bl.x + th.x];
U2_l_6 = U2[7] [4 + 16 * bl.x + th.x];
for (i = 0; i <= 255; i++) {
    if (i >= 1) {
        U2_l_7 = U2_l_5;
        U2_l_5 = U2_l_3;
        U2_l_3 = U2_l_1;
        U2_l_1 = U2[4] [4 + 16 * bl.x + th.x];
        U2_l_2 = U2_l_4;
        U2_l_4 = U2_l_6;
        U2_l_6 = U2_l_8;
        U2_l_8 = U2[8 + i][4 + 16 * bl.x + th.x];
    }
    if (i == 0) {
        U2_l_1 = U2[4] [4 + 16 * bl.x + th.x];
        U2_l_8 = U2[8] [4 + 16 * bl.x + th.x];
    }
    doall (j = max((=th.x+35)/16, 1); j <= (-th.x+23)/16; j++) {
        U2_l[16 * j + th.x] = U2[4 + i][16 * j + 16 * bl.x + th.x];
    }
    _ _syncthread(id=11, barrier=11, processors=null);
    U1[4 + i][4 + 16 * bl.x + th.x] = complex_expression
    _ _syncthread(id=12, barrier=12, processors=null);
}
```

Alternatively, it is a purpose of our invention to introduce unnecessary copies from main memory to local memory: U2_l_9=U[4][4+16*bl.x+th.x]

```
for (i = 0; i <= 255; i++) {
    doall (j = 0; j <- ( - th.x + 23) / 16; j++) {
        U2_1[16 * j + th.x] = U2[4 + i][16 * j + 16 * bl.x + th.x];
    }
    U2_1_7 = U2[i][4 + 16 * bl.x + th.x];
    U2_1_5 = U2[1 + i][4 + 16 * bl.x + th.x];
    U2_1_3 = U2[2 + i][4 + 16 * bl.x + th.x];
    U2_1_1 = U2[3 + i][4 + 16 * bl.x + th.x];
    U2_1_9 = U2[4 + i][4 + 16 * bl.x + th.x];
    U2_1_2 = U2[5 + i][4 + 16 * bl.x + th.x];
    U2_1_4 = U2[6 + i][4 + 16 * bl.x + th.x];
    U2_1_6 = U2[7 + i][4 + 16 * bl.x + th.x];
    U2_1_8 = U2[8 + i][4 + 16 * bl.x + th.x];
    _ _syncthread(id=11, barrier=11, processors=null);
    U1[4 + i][4 + 16 * bl.x + th.x] = complex_expression
    _ _syncthread(id=12, barrier=12, processors=null);
}
```

In this case, an embodiment of our invention produces the following optimized code, with copies from local memory U_2_1_1=U2_1_9, resulting in fewer accesses to main memory.

```
U2_1_7 = U2[0][4 + 16 * bl.x + th.x];
U2_1_5 = U2[1][4 + 16 * bl.x + th.x];
U2_1_3 = U2[2][4 + 16 * bl.x + th.x];
U2_1_1 = U2[3][4 + 16 * bl.x + th.x];
U2_1_9 = U2[4][4 + 16 * bl.x + th.x];
U2_1_2 = U2[5][4 + 16 * bl.x + th.x];
U2_1_4 = U2[6][4 + 16 * bl.x + th.x];
U2_1_6 = U2[7][4 + 16 * bl.x + th.x];
for (i = 0; i <= 255; 1++) {
    if (i >= 1) {
        U2_1_7 = U2_1_5;
        U2_1_5 = U2_1_3;
        U2_1_3 = U2_1_1;
        U2_1_1 = U2_1_9;
        U2_1_9 = U2_1_2;
        U2_1_2 = U2_1_4;
        U2_1_4 = U2_1_6
        U2_1_6 = U2_1_8;
        U2_1_8 = U2[8 + 1][4 + 16 * bl.x + th.x];
    }
    if (i == 0) {
        U2_1_8 = U2[8][4 + 16 * bl.x + th.x];
    }
    doall (j = max((=th.x+35)/16, 1);j <= (-th.x+23)/16; j++) {
        U2_1[16 * j + th.x] = U2[4 + i][16 * j + 16 * bl.x + th.x];
    }
    _ _syncthread(id=11, barrier=11, processors = null);
    U1[4 + i][4 + 16 * bl.x + th.x]= complcx_expression
    _ _syncthread(id=12, barrier=12, processors = null);
}
```

Embodiments of the present invention provide a custom computing apparatus, illustrated in FIG. 1, which is configured to optimize computer source code for operation on a second computing apparatus. As illustrated, first custom computing apparatus 10(a) is configured to communicate with second computing apparatus 10(b) across network 20. A further illustration of computing apparatus 10 is provided in FIG. 1. In this illustration custom computing apparatus 10(a) contains at least one processor 30 (a-n), a communication port 40 communicating with the at least one processor 30 (a-n). Custom computing apparatus 10(a) additionally includes memory 50, which in some embodiments includes dependence analysis module 220. Custom computing apparatus 10(a), in some embodiments, additionally includes drive 70 configured to accept external storage medium 80. In some embodiments, external storage medium 80 is a CD, in others a DVD. In these embodiments, drive 70 is configured to accept the appropriate external storage medium 80. While CD and DVD are specifically enumerated in these embodiments, there are many external storage media that can be used to practice various aspects of the invention therefore some embodiments are not limited to the particular drive 70 configuration or external media 80. Custom computing apparatus 10(a) additionally includes storage medium 60. Storage medium 60 in some embodiments is a hard-disk drive, and in others is a solid state drive. In some embodiments, storage medium 60 contains a set of processor executable instructions that when executed by the at least one processor 30(a-n) configure the first custom computing apparatus 10(a) to optimize computer code for execution on the second computing apparatus 10(b).

The second computing apparatus 10(b) includes one or more main memory modules, and one or more local memory modules. The computing apparatus 10(b) also includes a number of computation units, such as processors or processor cores, and at least one of those computation units includes a private memory region. One or more computation units may include several private memory regions. In some embodiments, however, none of the computation units includes a private memory region. While custom computing apparatus 10(a) and computing apparatus 10(b) are illustrated in FIG. 1 communicating over network 20, various embodiments of the invention do not require this inter-computer communication.

With reference to FIGS. 2A and 2B, the advantage of varying the granularity of the communications is illustrated. The code shown in FIG. 2A requires one Read C operation corresponding to the Receive 1 communication, one Read A operation corresponding to Receive 2 communication, and one Read B operation corresponding to Receive 3 communication. The Read operations are followed by a compute operation and one Write C operation corresponding to Send 2 communication.

In contrast, the code shown in FIG. 2 performs the same operations but with a finer granularity of communications. As such, the size of the data transferred in each one of the Read C, Read A, Read B, and Write C operations is smaller. But these operations are repeated and the amount of computations interleaved between the one or more repetitions is also smaller. This can enable the use of multiple processors, each having a small local memory in a multi-processor system, and thus, varying the communication granularity can facilitate a computation-to-communication tradeoff.

Figure 3A:
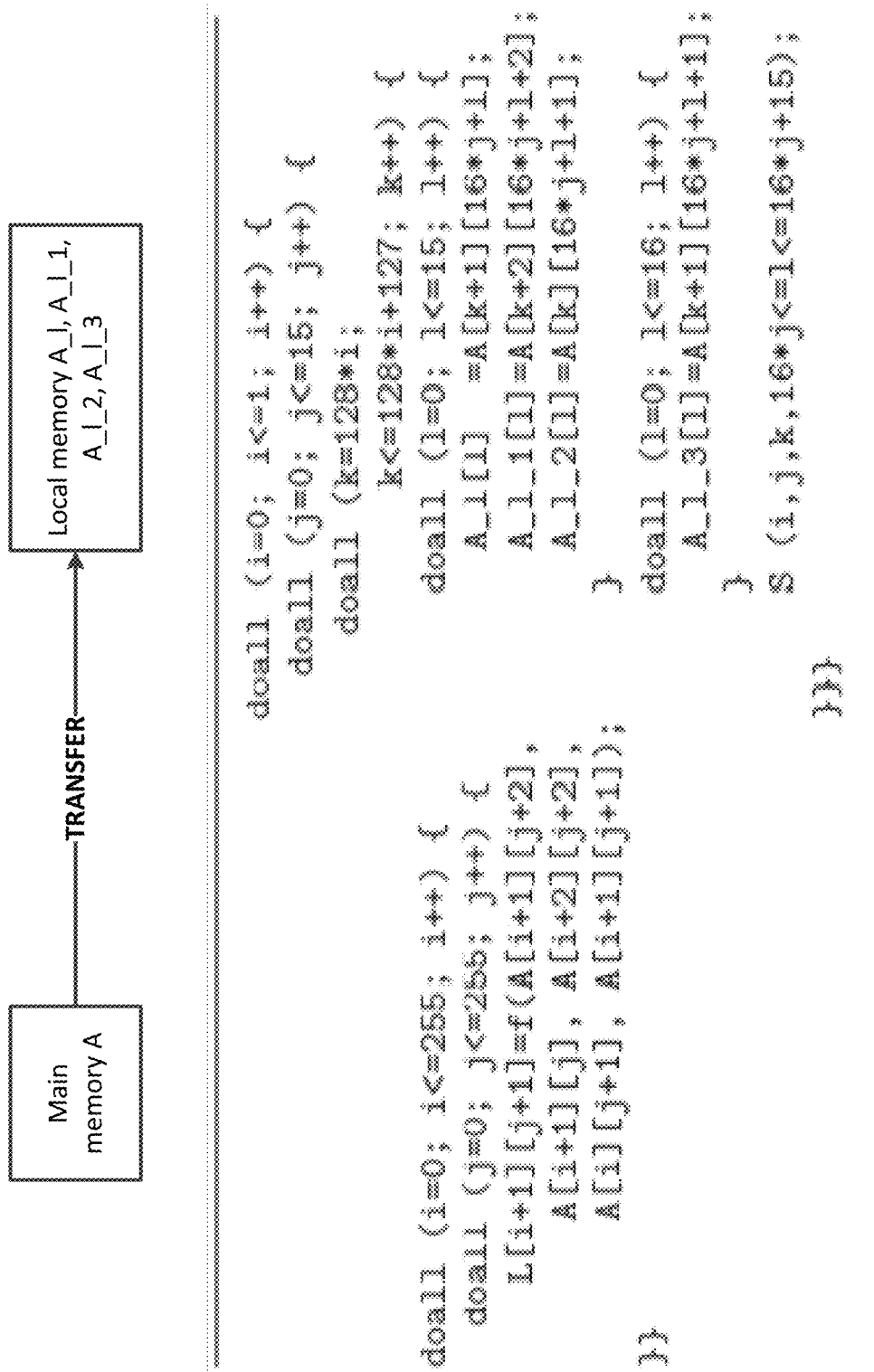
FIGS. 3A and 3B illustrate local memory reuse according an a provided embodiment.
Figure 3B:
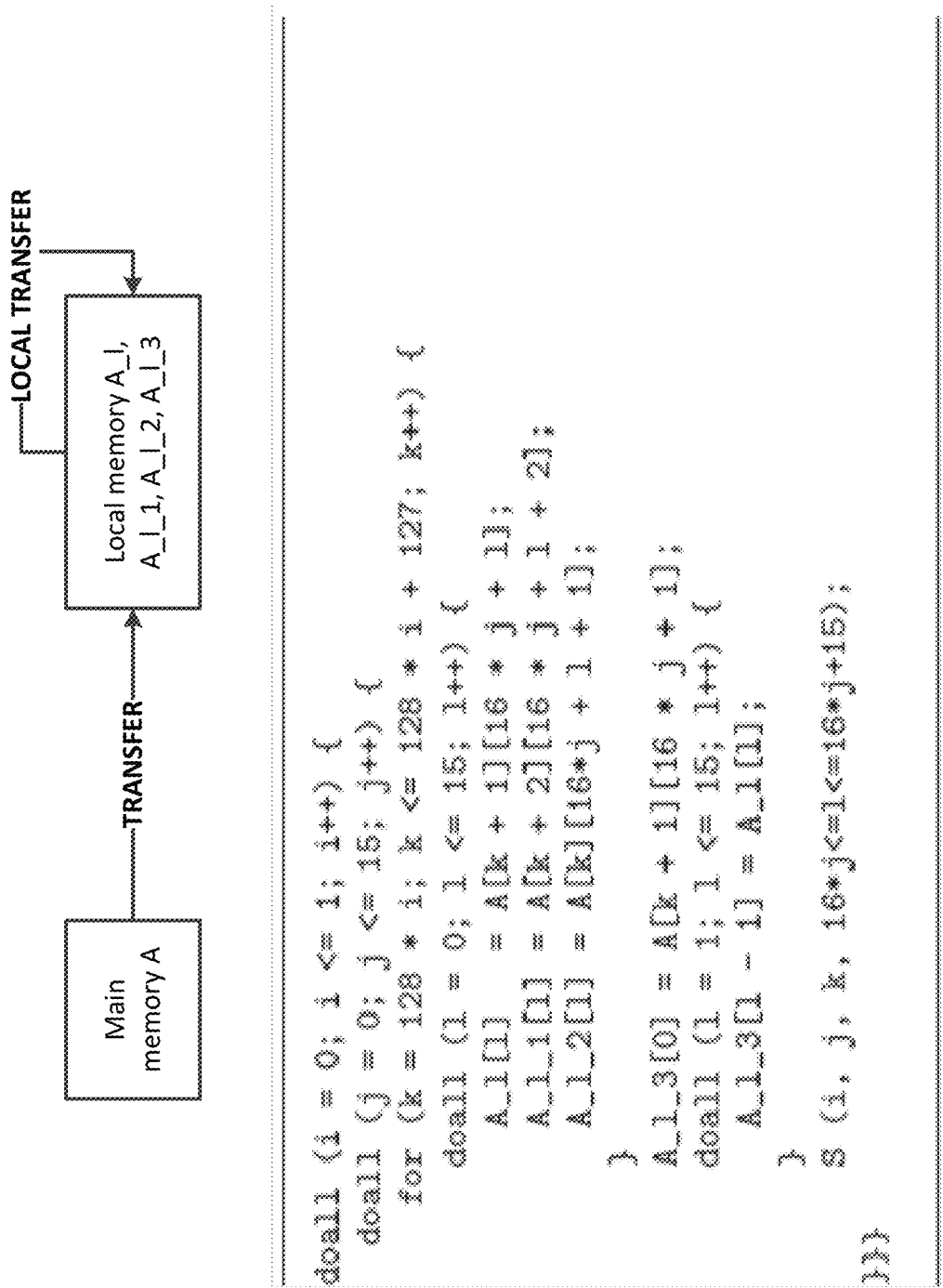

FIG. 3A depicts code for which data from main memory must be copied into local memory, such as the private memory of a processor, in each loop iteration. In contrast, in the code optimized according to one embodiment, once the data is stored in the private memory, e.g., A_1_1, A_1_2, and A_1_3, those data are copied within the private/local memory and is reused in subsequent loop iterations instead of being copied again from the main memory.

For the purpose of illustration, an algorithm corresponding to various embodiments of the invention is provided in FIG. 4. In step 1, maximal consecutive sets of operations are formed that read data from remote memory and write into local memory. By construction, these copies are parallel and do not contain self-dependences. In step 2, sets are sorted according to their footprint in remote memory. Sorting is performed by topological comparisons of polyhedral. Sorting orders RAR dependences and improves the propagation of dataflow values. In step 3. Iterations are performed over communication statements in the order induced by their footprints. Step 4 selects a candidate dimension d on which reuse is computed. The potential reuse loop is the first that encompasses both communication statements and original statements of the program and it must not be used in the placement function $\Pi_S$ of any of the communication statements. If a proper dimension is not found, optimizing the current group fails. In step 5, Read-After-Read dependences on the remote arrays are computed with distances of 1 on loop d and distances of 0 up to loop d. Continuing to step 6, further constrains the Read-After-Read dependence by memory addressability constraints. These constraints force the equality of the placement dimensions of S and T for processing elements that do not address the same local memory. In particular embodiments, CUDA technology is used in which, threadblocks do not use the same portion of the shared memory whereas threads within a same threadblock do. Addressability constraints are specific to a particular memory and a particular processing element in the machine model hierarchy. If placements are incompatible between copies, the dependence is empty. In step 7, if the dependence is empty, the original domain of S is added along with S to the unoptimized set. The loop in step 3. then proceeds. If the dependence is not empty then an optimized transfer will be generated. Steps 11-12 examine addressability properties of the local memory with respect to processing elements. If the local memory is not addressable, a copy alignment operation is performed which consists in shifting the target of the memory copy by a constant amount. Steps 13-15. form the domains of the optimized and unoptimized transfers using differences of polyhedral, also called index-set splitting. The unoptimized copies are the complement of the optimized copies in the original domain of statement S. Statement T provides the optimized variable and access function. Steps 16-20. remove all copies and recreate new statements. These new statements are clones of the original copies where only the domain and the optimized read are updated. The insertion step 21. uses a tree structure to represent the beta coordinates and automatically updates the new beta vector for the inserted statements. Viewing beta in a tree representation is common knowledge in the field.

The following figure exemplifies topological sorting of footprints by their remote memory address performed in step 2. Arrays a1, a2 and a3 reside in local memory, array A resides in remote memory. Without sorting by footprint the copy a3[i]=a1[i] is not legal by virtue of the dependences computed in step 5 and the optimization does not happen as illustrated in the code versions on the left and in the center. The code version on the right shows better loop-independent reuse thanks to sorting. This property also extends to loop-carried reuse.

```
for (i=0;i<=N;i++) {      for (i=0;i<=N;i++) {      for (i=0;i<=N;i++) {
  a1[i] = A[i]              if (i = = 0) {             if (i = = 0) {
  a2[i] = A[i+1]              a1[i] = A[i]              a3[i] = A[i-1]
  a3[i] = A[i-1]              a2[i] = A[i+1]            a1[i] = A[i]
  ...                         a3[i] = A[i-1]            a2[i] = A[i+1]
}                           }                         }
                            if (i >= 1) {             if (i >= 1) {
                              a1[i] = a2[i]             a3[i] = a1[i]
                              a2[i]= A[i+1]             a1[i] = a2[i]
                              a3[i]= A[i-1]             a2[i] = A[i+1]
                            }                         }
                            ...                       ...
                          }                         }
```

It is another purpose of this invention to perform loop interchange on the innermost loops of communication transfer code to help unrolling and reduce synchronization on CUDA architectures. The following code exemplifies this phenomenon: the innermost loop is easier to unroll in the right code variant. On CUDA architectures, thread divergence forces synchronizations in the j loop. The left version has twice as many synchronizations than the version on the right. Loop interchange is a well-known transformation, it is an object of this invention to apply it specifically in the context of communication statements that have been optimized for reuse and to reduce thread divergence on CUDA architectures.

```
int ix = 32 * bl.x + th.x;
int iy = 8 * bl.y + th.y;           //After Interchange
for (k=0;k<=1;k++) {                for (j=0; j<=(th.x+39>>5); j++) {
  for (j=0; j<=(th.x+39>>5); j++) {   for (k=0;k<=1;k++) {
    U2_1[8*k+th.y][32*j+th.x] =         U2_1[8*k+th.y][32*j+th.x] =
    U2_3[4+i][8*k+iy][32*j+ix];         U2_3[4+i][8*k+iy][32*j+ix];
}}                                  }}
```

Thus, it is seen that methods and an apparatus for optimizing source code on a custom first computing apparatus for execution on a second computing apparatus are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, transformations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method for improving data movements during parallelized execution of a program on a multi-execution unit computing apparatus, the method comprising:
  receiving in memory on a first computing apparatus, a computer program comprising a loop nest, the first computing apparatus comprising the memory and a processor;
  transforming the computer program for execution on a second computing apparatus, the second computing apparatus comprising a plurality of computation units, the transformation comprising:
    selecting a communication statement within the loop nest, the communication statement transferring a data element from a first data structure to a second data structure;
    identifying a candidate loop within the loop nest wherein a placement function for the communication statement, that designates execution of instances of the communication statement to the plurality of computation units, is invariant across an iteration domain of a sub-loop-nest within the candidate loop;
    determining that:
      a plurality of memory accesses associated with the instances of the communication statement are invariant across the iteration domain of the sub-loop-nest; and the instances of the communication statement lack data dependencies with one or more instances of another statement; and hoisting the communication statement outside the candidate loop or conditioning the communication statement on a particular iteration of the candidate loop.

2. The method of claim 1, wherein:

the first data structure is formed within a global memory accessible to each of the plurality of computation units; and the second data structure is formed within a local memory of a first processing unit in the plurality of computation units.

3. The method of claim 2, wherein the local memory of the first processing unit is not accessible to any other processing unit in the plurality of computation units.

4. The method of claim 2, wherein the local memory of the first processing unit is accessible to at least one other processing unit but is not accessible to all processing units in the plurality of computation units.

5. The method of claim 1, wherein:

the first data structure is formed within a local memory of a first processing unit in the plurality of computation units; and the second data structure is formed within a global memory accessible to each of the plurality of computation units.

6. The method of claim 1, wherein the data dependency comprises a read-after-write dependency or a write-after-read dependency.

7. The method of claim 1, wherein the transformation comprises, prior to the selecting, identifying, determining, and hoisting steps, tiling the loop nest.

* * * * *